United States Patent [19]

McNicol et al.

[11] Patent Number: 5,036,526
[45] Date of Patent: Jul. 30, 1991

[54] METHOD OF COMMUNICATING STUFFING INDICATIONS IN A MULTI-LEVEL COMMUNICATIONS SYSTEM

[75] Inventors: John D. McNicol, Nepean; Iwan D. Jemczyk, Ottawa, Both of Canada

[73] Assignee: Northern Telecom Limited, Montreal, Canada

[21] Appl. No.: 82,893

[22] Filed: Aug. 10, 1987

[51] Int. Cl.$^5$ .............................................. H04L 7/04
[52] U.S. Cl. ..................... 375/39; 370/102; 375/112
[58] Field of Search ............ 370/119, 20, 110.1, 370/110.4, 101, 102; 375/39, 42, 106, 112, 121; 332/103

[56] References Cited

U.S. PATENT DOCUMENTS

| | | | |
|---|---|---|---|
| 4,525,846 | 6/1985 | Bremer et al. | 370/20 |
| 4,627,077 | 12/1986 | Armstrong | 370/110.4 |
| 4,630,287 | 12/1986 | Armstrong | 370/110.4 |
| 4,644,537 | 2/1987 | Gitlin et al. | 375/39 |
| 4,651,320 | 3/1987 | Thapar | 375/39 |

Primary Examiner—Benedict V. Safourek
Attorney, Agent, or Firm—R. John Haley; Dallas F. Smith

[57] ABSTRACT

In a QAM radio transmission system, stuffing indications for a transmitted stuffed data signal are transmitted only once rather than repeatedly. The two possible states of each stuffing indication are represented by respective sets of signal points in the signal point constellation, with a separation between any two signal points in the different sets which is at least three times the signal point separation of the system. The reliability with which the stuffing indications are sent is much greater than for other transmitted information.

28 Claims, 2 Drawing Sheets

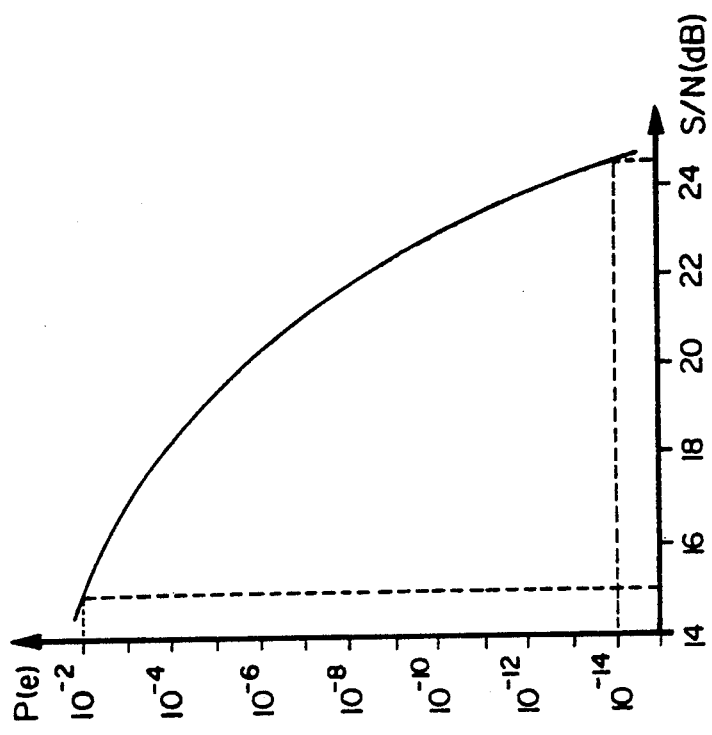
FIG. 1 PRIOR ART
FIG. 2 PRIOR ART
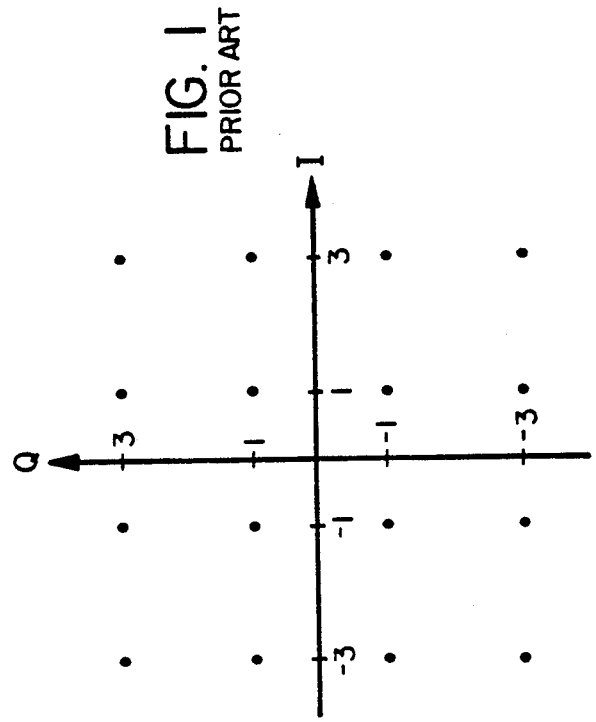
FIG. 3

METHOD OF COMMUNICATING STUFFING INDICATIONS IN A MULTI-LEVEL COMMUNICATIONS SYSTEM

This invention relates to a method of communicating selected information, and particularly stuffing indications, in a multi-level communications system.

In order to provide a high rate at which information can be transmitted via a transmission channel of limited bandwidth, it is known to use multi-level modulation schemes and hence communications systems. In such systems each transmitted information symbol can have one of more than two discrete states, and hence can represent more than one binary digit, whereby the transmitted information rate is greater than the transmitted symbol rate. With an increased number of discrete states or levels the resultant information transmission rate for a given symbol rate is also increased, but it becomes more difficult to distinguish between the different levels at a receiver of the system and the sensitivity of the system to errors, for example due to noise, is also increased.

An example of a multi-level communications system is a QAM (quadrature amplitude modulation) microwave radio transmission system, in which two carrier signal components in phase quadrature are each amplitude modulated. For example, in a 64 QAM system each carrier signal component is amplitude modulated with one of eight discrete amplitude levels, whereby each transmitted symbol can have any one of 64 distinct phase and amplitude states, and can represent 6 bits ($2^6 = 64$).

The information which is required to be transmitted via such a transmission system typically comprises at least one high-speed data bit stream which may include stuffed bits for synchronization purposes. As is well-known, such bit streams must also provide an indication of the presence or absence of stuffing in any particular time division multiplex frame, and hence it is known to provide stuffing indication bits in the multiplexed bit stream for this purpose.

It is essential that the stuffing indication bits be reliably transmitted and received, as a failure to do this can result in not only corrupted information but also lost frame synchronization. Accordingly, it is normal to transmit the stuffing indication bit in each frame, representing the presence or absence of stuffed information in that frame, repeatedly within the frame. Generally the stuffing indication bit may be transmitted three times in different, well-separated, bit positions in the frame, with a majority decision being made from these bits at the receiver to interpret the stuffing indication. Thus corruption of only one of the three bits, for example due to a noise spike during transmission, has no adverse effect.

In practice, it has been found that the reliability with which the stuffing indications are transmitted is a predominant factor in determining the reliability of a radio transmission system overall. Thus increased reliability of the system can only be achieved if the reliability of transmitting stuffing indications is increased.

For greater reliability, therefore, it is known to transmit the stuffing indication bit a greater number of times during the frame, for example five times rather than three times, with a majority decision being made whereby any two of these bits can be corrupted without an adverse effect. However, the greater reliability is achieved at the expense of an increased amount of overhead information (stuffing indication bits) which must be transmitted, and this is itself a significant disadvantage.

This disadvantage is exacerbated by the need to provide for the transmission of stuffing indication bits for each of a plurality of independent data streams which may be multiplexed together for transmission but each of which may be stuffed independently of the others. For example, if a transmission system is to be capable of flexibly accommodating up to six independent data streams, and if for reliability five stuff indication bits are needed for each such data stream, this requires the use of a multiplex frame providing a total of 30 fixed overhead information bit positions for stuffing indication bits alone. Such bit positions must be available in the frame even though generally a smaller number of independent data streams may be present on a particular transmission channel.

An object of this invention, therefore, is to provide an improved method of communicating overhead information, in particular stuffing indications, in a multi-level communications system.

According to one aspect of this invention there is provided a method of communicating selected information in a multi-level data communications system in which each communications symbol is constituted by one of more than two signal points in a predetermined signal point constellation, the signal points having a predetermined minimum separation therebetween, comprising the steps of: transmitting a first state of said selected information using any of a first set of one or more signal points in said constellation; and transmitting a second state of said selected information using any of a second set of one or more signal points in said constellation; wherein said first and second sets are selected so that each signal point in the first set is separated from each signal point in the second set by an amount greater than said predetermined minimum separation.

In its simplest form, the signal point constellation could conceivably have three signal points, such as amplitude levels of an amplitude modulated signal, any one of which would normally be used for the communication, e.g. transmission or storage, of information. In this case for the communication of the selected information the middle amplitude level would be unused, and the first and second states of the selected information would be represented by the outer modulation amplitude levels, whereby a greater separation between signal points, and hence a greater signal-to-noise ratio, is achieved for the selected information than for other, normal information.

Usually, however, the signal point constellation will have $2^n$ signal points, where n is a plural integer, and each of the first and second sets will have $2^{n-2}$ signal points, whereby half of the signal points are not used when communicating the selected information and enable the enhanced signal-to-noise ratio to be achieved. Typically, the communications system may be an amplitude modulated or a QAM system for communicating a stuffed data signal, the selected information comprising stuffing indications for the data signal.

According to another aspect this invention provides a method of representing stuffing indications for a stuffed data signal for transmission via a multi-level data transmission system, each stuffing indication comprising a first state or a second state, comprising representing the first state by a first combination of a plurality of bits and the second state by a second combination of a plurality of bits of a single symbol of the system, said first and second combinations corresponding respectively to first and second sets of signal points in a signal point constellation of the system, each signal point in the first set being separated from each signal point in the second set by an amount greater than a predetermined minimum signal point separation of the system.

Preferably the separation of each signal point in the first set from each signal point in the second set is at least substantially three times said predetermined minimum signal point separation of the system, and each of said first and second combinations comprises two bits.

The invention is particularly applicable to systems, such as microwave radio systems using QAM, in which the signal point constellation has $2^n$ signal points, where n is a plural integer and is usually 4 or more.

The invention is also applicable to hexagonal-packed (honeycomb) QAM and other signal point constellations, which may have different minimum separations between the signal points of the first and second sets. For example, a doubling of the minimum signal point separation of the system could be sufficient to give a significantly improved performance in particular circumstances.

According to a further aspect of this invention there is provided a method of transmitting stuffing indications for a stuffed data signal in a multi-level transmission system, comprising the step of transmitting each stuffing indication only once using signal points of a single transmitted symbol to represent different states of the stuffing indication, the signal points representing said different states having a minimum separation which is greater than a predetermined minimum signal point separation of the system.

The invention will be further understood from the following description by way of example of embodiments thereof with reference to the accompanying drawings, in which:

FIG. 1 illustrates a known 16 QAM signal point constellation;

FIG. 2 is a graph illustrating the known relationship between signal-to-noise ratio and error probability in a 16 QAM transmission system;

FIG. 3 is an amplitude level and coding diagram with reference to which the principles of this invention are explained.

Figure 4:
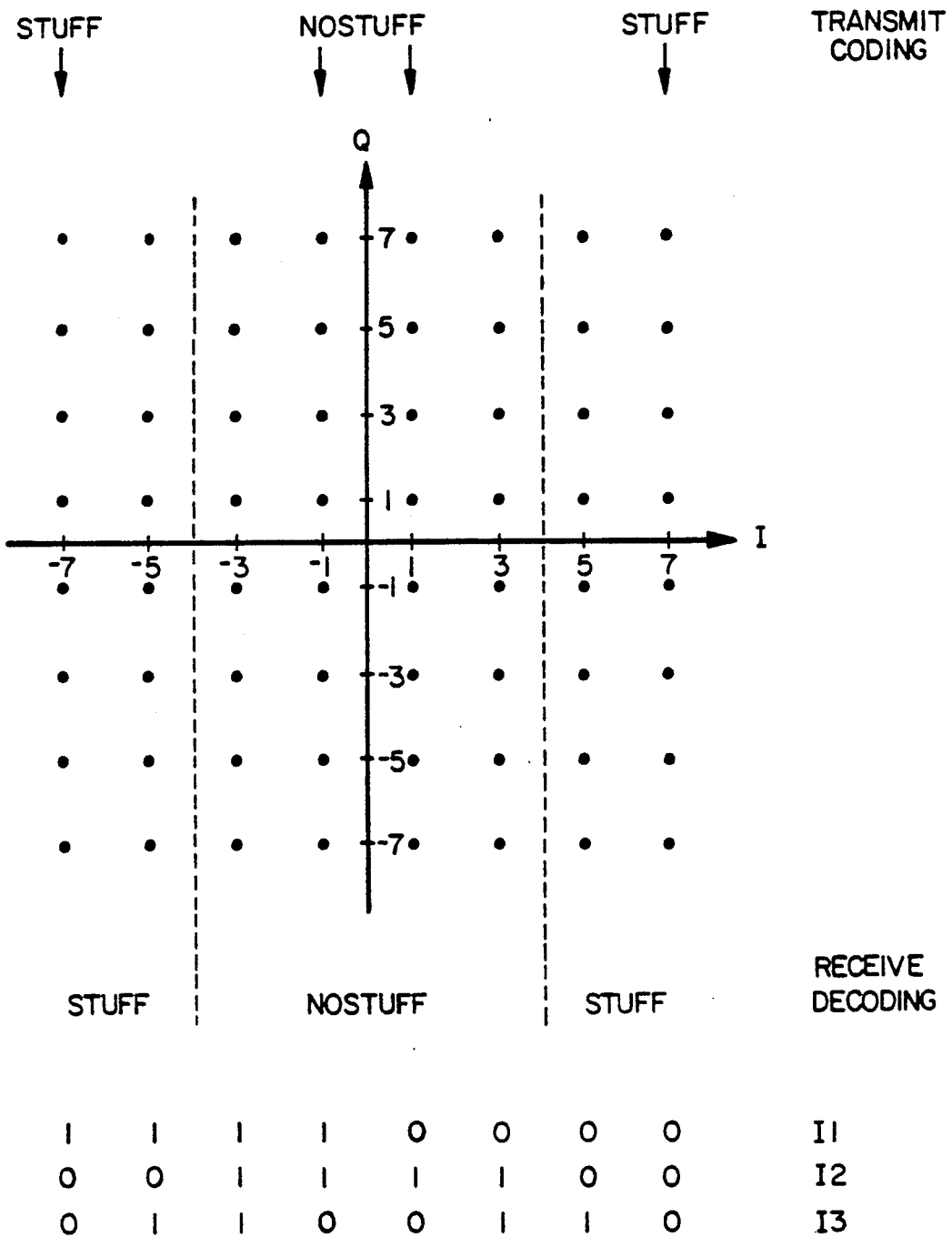
FIG. 4 illustrates a 64 QAM signal point constellation illustrating stuffing indication coding and decoding in accordance with an embodiment of the invention.

In a conventional manner, FIG. 1 illustrates a signal point constellation for a 16 QAM modulation scheme, in which each one of 16 possible symbols has a respective one of four amplitudes ($-3$, $-1$, 1, or 3 volts) for two phase quadrature signal components I and Q. Each symbol in such a modulation scheme can represent four bits ($2^4 = 16$).

In known transmission systems, in order to transmit a stuffing indication bit this bit, together with three other bits of overhead information, are used collectively to provide a respective symbol for transmission. The three other bits are not concerned in any way with the stuffing indication. The state of the stuffing indication bit thus identifies two sets of 8 possible points in the signal point constellation, one of which sets corresponds to a stuff indication and the other of which sets corresponds to a nostuff indication in the relevant multiplex frame. The particular symbol which is transmitted may, as far as the stuffing indication is concerned, be constituted by any of the respective 8 possible signal points.

For example, the 8 possible signal points corresponding to a stuff indication may be selected to be those with a positive amplitude I, with a negative amplitude I corresponding to a nostuff indication. Assuming this situation as an example, then on decoding the stuffing indication at a receiver a positive signal component I will be taken to represent a stuffed frame and a negative signal component I will be taken to represent a nostuff condition, i.e. that the frame contains no stuffed information.

In practice, at the receiver the signal points are displaced from their ideal positions shown in FIG. 1, due to transmission characteristics and noise. It can be seen that a displacement of a signal point with an amplitude of $-1$ volt for the I signal component through at least $+1$ volt will result in it being misinterpreted at the receiver as having a positive I signal component. If this signal point represented a nostuff indication, then a stuff indication will be erroneously detected. The probability of an incorrect stuffing bit interpretation is, in such a situation, the same as the probability of any bit error in the transmission system. This probability P(e) can be quite high, for example of the order of $10^{-2}$ or $10^{-3}$, in typical microwave radio transmission systems in worst-case situations.

As clearly described, in the prior art the reliability of transmitting the stuffing indication bit is increased by transmitting it repeatedly in each frame, so that at the receiver a majority decision of 2 out of 3, or 3 out of 5, bits can be made for the stuffing indication. For a bit error probability P(e) of $10^{-3}$, the probability of a stuffing indication error then becomes $(10^{-3})^2 = 10^{-6}$ in the former case, or $(10^{-3})^3 = 10^{-9}$ in the latter case. The latter error probability is desirable, but is only achieved by the use of a five-fold increase in the rate of transmitted stuffing indications.

The invention can achieve a similar or greater improvement in error probability with only a doubling of the rate of transmitted stuffing indications.

FIG. 2 illustrates the known relationship between error probability P(e) and signal-to-noise ratio S/N in a 16 QAM transmission system. The invention makes use of this characteristic, and in particular the dramatic improvement in error probability with small improvements in signal-to-noise ratio, to improve the error probability for transmitted stuffing indications. This is explained below with reference to FIG. 3, which for simplicity relates only to two bits in an amplitude modulation scheme.

Referring to FIG. 3, the two bits referred to, in Gray code order, and corresponding amplitude levels of $+3$, $+1$, $-1$, and $-3$ volts are illustrated. It is important to note that these two bits are bits of the same symbol, and not of different symbols as in the case of the repeated stuffing indication bits in the prior art.

FIG. 3 also illustrates the coding and decoding of these two bits for stuffing indication purposes. As illustrated in FIG. 3, a stuff indication is represented by the bit combination 10 corresponding to an amplitude of $+3$ volts, and a nostuff indication is represented by the bit combination 00 corresponding to an amplitude of $-3$ volts. Thus the LSB (least significant bit) is 0 in either case and is effectively unused in transmitting the stuffing indication. The other two possible bit combinations, each with an LSB of 1, are not transmitted.

At the receiver, detection of either of the bit combinations 10 and 11 is interpreted as a stuff indication, and detection of either of the bit combinations 01 and 00 is interpreted as a nostuff indication. Thus although the bit combinations 11 and 01 are not transmitted for stuffing indication purposes, they are interpreted at the receiver.

As a result of this arrangement, it can be seen that a signal point displacement through at least 3 volts (from +3 volts to a negative value, or from −3 volts to a positive value) is necessary before a transmitted stuffing indication is wrongly interpreted at the receiver. Compared with the 1 volt signal point displacement discussed above, this represents a signal-to-noise ratio improvement of $20 \log(3/1) = 9.5$ dB for the transmission of stuffing indications. Referring to FIG. 2, it can be seen that even if the error probability P(e) for a 1 volt noise spike is about $10^{-2}$, such a 9.5 dB improvement in signal-to-noise ratio results in an error probability of the order of $10^{-14}$.

FIG. 4 illustrates an embodiment of the invention applied to a 64 QAM modulation scheme, in which there are 64 signal points in the constellation any particular one of which is selected by three Q bits (not represented) for the amplitude of the Q signal component and three I bits I1, I2, and I3 for the I signal component. In this case the two least significant I bits, I2 and I3, are used for the stuffing indication communication, and the most significant I bit, I3, and the three Q bits in the same symbol are used for other purposes. At the transmitter, a stuff indication is represented by the bits I2=0 and I3=0, and a nostuff indication is represented by the bits I2=1 and I3=0. These indications correspond to I signal amplitudes of ±7 volts and ±1 volts respectively, to achieve an optimum signal-to-noise ratio for the stuffing indication communication. At the receiver, a stuff indication is determined from the bit I2=0, and a nostuff indication is determined from the bit I2=1, regardless of the state of the bit I3.

From the above description, it can be seen that the invention resides in the use of a plurality of bit positions redundantly in the same transmitted symbol to transmit the stuffing indication, the bit positions being selected so that there is a greater separation between the states representing a stuff indication and the states representing a nostuff indication, and hence a greater signal-to-noise ratio, than there is for ordinary signal transmission in the system. In this manner, the probability of an error in the detected stuffing indication is greatly increased in accordance with the characteristic of FIG. 2.

It can be seen from the above description that in the signal point constellations of FIGS. 2, 3, and 4 the signal points have a predetermined minimum separation of 2 volts; i.e. each signal point is at least 2 volts different in the I and Q directions from each other signal point. In contrast, in the signal point constellations of FIGS. 3 and 4 the separation of each signal point which can be used to represent a stuff indication from each signal point which can be used to represent a nostuff indication is increased to 6 volts, or 3 times the predetermined minimum separation.

Although the invention has been described in relation to a QAM modulation scheme, it is equally applicable to any other form of multiple level modulation scheme. As the invention relies upon the use of redundancy of bit positions within a single transmitted symbol it is not, however, applicable to binary systems in which each symbol has only two possible states, i.e. the symbol rate is the same as the bit rate.

Furthermore, although as described above two adjacent I bits are used for the stuffing indication, this need not be the case. More than two bits may be used if desired to achieve an even greater signal-to-noise ratio for the stuffing indications, and other combinations of I and/or Q bits may be used to represent the stuff and nostuff situations. What is important for effective operation is not the particular bits which are used, but that in the resulting signal point constellation each signal point which can represent a stuff indication is separated from each signal point which can represent a nostuff indication by an amount which is greater than the normal separation of signal points within the constellation, whereby the signal-to-noise ratio of stuffing indications is greater than that of the system as a whole.

In addition, although the above description relates specifically to the transmission of stuffing indications, it should be appreciated that the invention may be used in a similar manner for the transmission of any selected information with a higher than normal reliability.

Accordingly, numerous modifications, variations, and adaptations may be made to the described embodiments without departing from the scope of the invention as defined in the claims.

What is claimed is:

1. A method of communicating selected information in a multi-level data communications system in which each communications symbol is constituted by a signal point in a predetermined signal point constellation comprising a plurality of signal points having a predetermined minimum separation therebetween, comprising the steps of:

transmitting a first state of said selected information using any of a first set comprising a plurality of signal points in said constellation; and transmitting a second state of said selected information using any of a second set comprising a plurality of signal points in said constellation;

wherein said first and second sets are selected so that each signal point in the first set is separated from each signal point in the second set by an amount greater than said predetermined minimum separation.

2. A method as claimed in claim 1 wherein the predetermined signal point constellation has $2^n$ signal points, where n is a plural integer.

3. A method as claimed in claim 2 wherein each of said first and second sets has $2^{n-2}$ signal points.

4. A method as claimed in claim 1 wherein the selected information comprises stuffing indications for a stuffed data signal communicated via the communications system.

5. A method as claimed in claim 1 wherein the communications system is an amplitude modulated system and the signal points comprise different amplitude levels.

6. A method as claimed in claim 1 wherein the communications system is a quadrature amplitude modulated system and the signal points comprise different phase and amplitude states.

7. A method as claimed in claim 3 wherein the communications system is a quadrature amplitude modulated system for communicating a stuffed data signal and the selected information comprises stuffing indications for the data signal.

8. A method of representing stuffing indications for a stuffed data signal for transmission via a multi-level data transmission system, each stuffing indication comprising a first state or a second state, comprising representing the first state by a first combination of a plurality of bits and the second state by a second combination of a plurality of bits of a single symbol of the system, said first and second combinations corresponding respectively to first and second sets of signal points in a signal point constellation of the system, each signal point in the first set being separated from each signal point in the second set by an amount greater than a predetermined minimum signal point separation of the system.

9. A method as claimed in claim 8 wherein the separation of each signal point in the first set from each signal point in the second set is at least substantially three times said predetermined minimum signal point separation of the system.

10. A method as claimed in claim 9 wherein each of said first and second combinations comprises two bits.

11. A method as claimed in claim 8 wherein the signal point constellation has $2^n$ signal points, where n is a plural integer.

12. A method as claimed in claim 8 wherein the signal point constellation has $2^n$ signal points, where n is an integer equal to or greater than 4.

13. A method as claimed in claim 9 wherein the signal point constellation has 2n signal points, where n is a plural integer.

14. A method as claimed in claim 9 wherein the signal point constellation has $2^n$ signal points, where n is an integer equal to or greater than 4.

15. A method of transmitting stuffing indications for a stuffed data signal in a multi-level transmission system, comprising the step of transmitting each stuffing indication only once using signal points of a single transmitted symbol to represent different states of the stuffing indication, the signal points representing said different states having a minimum separation which is greater than a predetermined minimum signal point separation of the system.

16. A method as claimed in claim 15 wherein the signal points representing said different states have a minimum separation which is at least substantially three times said predetermined minimum signal point separation of the system.

17. A method as claimed in claim 15 wherein the transmission system is a quadrature amplitude modulated radio transmission system.

18. A method of representing selected information, having a first state or a second state, for communication via a quadrature amplitude modulated communications system in which each communications symbol corresponds to a signal point selected from a signal point constellation comprising $2^n$ signal points with a predetermined minimum separation therebetween, where n is an integer equal to or greater than 4, comprising the steps of:
selecting in the signal point constellation a first set of signal points and a second set of signal points, each of the first and second sets comprising $2^{n-2}$ signal points, each signal point in the first set being separated from each signal point in the second set by an amount greater than the predetermined minimum distance;
representing the first state of the selected information using a signal point selected from only the first set of signal points; and
representing the second state of the selected information using a signal point selected from only the second set of signal points.

19. A method as claimed in claim 18 wherein the amount by which each signal point in the first set of signal points is separated from each signal point in the second set of signal points is at least substantially three times the predetermined minimum distance.

20. A method as claimed in claim 18 wherein the selected information comprises a stuffing indication for a stuffed data signal communicated via the communication system.

21. A method as claimed in claim 19 wherein the selected information comprises a stuffing indication for a stuffed data signal communicated via the communications system.

22. A method of communicating selected information in a multi-level data communications system in which each communications symbol is constituted by one of more than two signal points in a predetermined signal point constellation, the signal points having a predetermined minimum separation therebetween, comprising the steps of:
transmitting a first state of said selected information using any of a first set of one or more signal points in said constellation; and
transmitting a second state of said selected information using any of a second set of one or more signal points in said constellation;
wherein said first and second sets are selected so that each signal point in the first set is separated from each signal point in the second set by at least double said predetermined minimum separation.

23. A method as claimed in claim 22 wherein the predetermined signal point constellation has $2^n$ signal points, where n is a plural integer.

24. A method as claimed in claim 23 wherein each of said first and second sets has $2^{n-2}$ signal points.

25. A method as claimed in claim 22 wherein the selected information comprises stuffing indications for a stuffed data signal communicated via the communications system.

26. A method as claimed in claim 22 wherein the communications system is an amplitude modulated system and the signal points comprise different amplitude levels.

27. A method as claimed in claim 22 wherein the communications systems is a quadrature amplitude modulated system and the signal points comprise different phase and amplitude states.

28. A method as claimed in claim 23 wherein each signal point in the first set is separated from each signal point in the second set by at least substantially three times said predetermined minimum separation.

* * * * *